United States Patent [19]
Baka et al.

[11] Patent Number: 5,622,214
[45] Date of Patent: Apr. 22, 1997

[54] AWNING ASSEMBLY WITH STOWABLE SUPPORT ARMS

[75] Inventors: Gregory J. Baka, Corunna; Dale G. Malott, Middlebury, both of Ind.

[73] Assignee: The Dometic Corporation, LaGrange, Ind.

[21] Appl. No.: 159,083

[22] Filed: Nov. 29, 1993

[51] Int. Cl.$^6$ ................................. E04F 10/06
[52] U.S. Cl. ....................... 160/71; 160/66; 160/75; 135/88.11
[58] Field of Search ................. 160/22, 46, 66, 160/71, 68, 74, 75, 80, 65, 78, 82; 135/88.1, 88.11

[56] References Cited

U.S. PATENT DOCUMENTS

| | | |
|---|---|---|
| 2,079,073 | 5/1937 | Knoll ........................ 160/71 X |
| 3,923,074 | 12/1975 | McKee . |
| 4,068,673 | 1/1978 | Bernardi .................... 160/71 X |
| 4,164,972 | 8/1979 | Bennett . |
| 4,171,013 | 10/1979 | Clark . |
| 4,188,964 | 2/1980 | Greer . |
| 4,198,998 | 4/1980 | Duffy ........................ 160/66 X |
| 4,634,172 | 1/1987 | Duda ........................ 160/66 X |
| 4,640,332 | 2/1987 | Turner ...................... 160/71 X |
| 4,658,877 | 4/1987 | Quinn . |
| 4,719,954 | 1/1988 | Curtis et al. . |
| 4,754,774 | 7/1988 | Leader . |
| 4,801,119 | 1/1989 | Pelletier . |
| 5,044,416 | 9/1991 | Murray . |
| 5,170,811 | 12/1992 | Kirk et al. . |
| 5,174,352 | 12/1992 | Murray et al. . |
| 5,192,111 | 3/1993 | Hanemaayer . |
| 5,333,663 | 8/1994 | Eger ............................ 160/22 |

FOREIGN PATENT DOCUMENTS 45348  4/1935  France ........................ 160/68

Primary Examiner—Blair Johnson
Attorney, Agent, or Firm—Pearne, Gordon, McCoy & Granger

[57] ABSTRACT

An improved awning assembly for a recreational vehicle has the awning rolled around a roller tube. A lead rail is attached to an edge of the awning. Support arms are stowed and latched in the lead rail and pivot downwardly therefrom. A sliding and pivoting latch mechanism holds the lead rail in the retracted position. The support arms are attached to feet on the vehicle with a spring latch mechanism. Spring loaded rafter arms slide in a channel on the back of the lead rail and are positioned to tension the awning. The awning provides a compact and attractive assembly in the stowed position and is easily erected by one person.

24 Claims, 11 Drawing Sheets

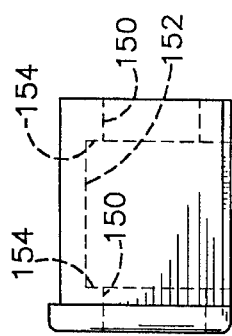
Fig.3A
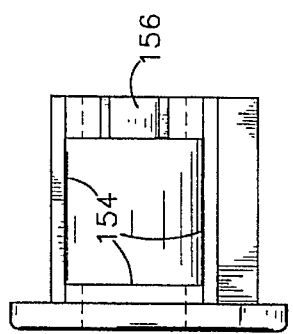
Fig.3B
Fig.3C
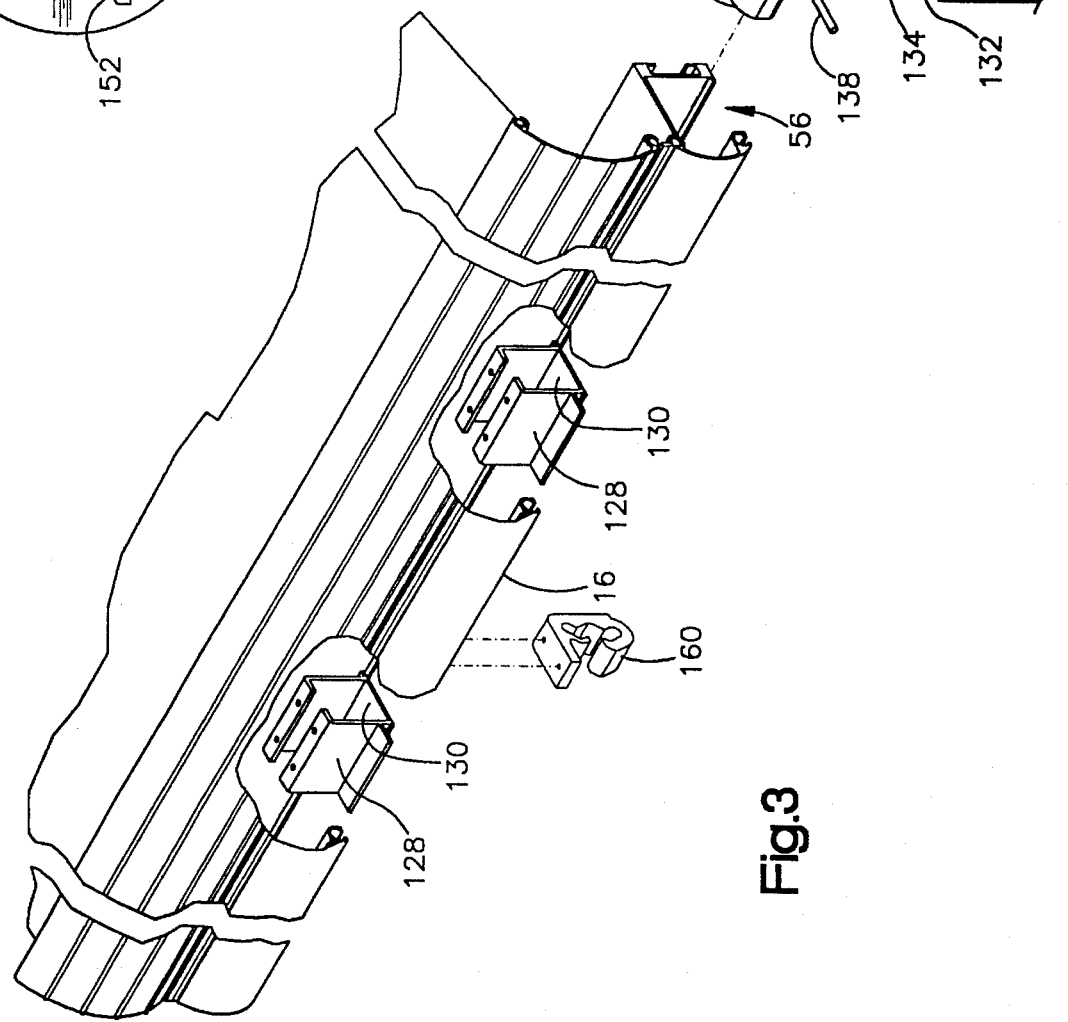
Fig.3

AWNING ASSEMBLY WITH STOWABLE SUPPORT ARMS

BACKGROUND OF THE INVENTION

1. Field of the Invention

This invention relates generally to the field of awnings and specifically to a retractable and stowable support assembly therefor.

2. Description of the Related Art

There are a number of known retractable assemblies that support an awning to create a sheltered area. The awning is usually supported in a generally horizontal position with a slight slope to facilitate runoff of rainwater. Commonly, one edge of the awning is attached to a wall. The opposite edge is attached to a tube, rod, rail or other similar elongated member, which is supported by two support arms. The support arms rest on the ground or are mounted to a lower part of the wall. Tension rafter arms are disposed between the wall and the tube or rail to stretch the awning and hold it in position. In this way, a convenient shelter is formed adjacent the wall to protect people and objects beneath the wall from rain and direct sun.

Retractable awnings can be divided into two general classes. Box type awnings have a stationary roller tube mounted to the wall. The awning is rolled around the tube for storage. The box comprises a stationary enclosure for the awning, a cover of which is opened to permit access to the awning which is unrolled to an extended position. Alternatively, a movable cover is attached to the free end of the awning to complete the enclosure when the awning is retracted. U.S. Pat. No. 4,171,013 to Clark shows an example of one such awning assembly.

Shifting roll type awnings have a roller tube suspended between the support arms. The tube is moved laterally to unroll or roll the awning on the tube. One edge of the awning is rigidly attached to the wall. It is less common, but still possible, for this type of awning to be enclosed in a case in its retracted position. U.S. Pat. No. 4,658,877 to Quinn shows an example of such an awning assembly. In both types the roller tube may be spring balanced or spring biased to aid rolling.

A popular application for such awnings is on recreational vehicles. The awning creates a convenient outdoor shelter next to the vehicle. Simple and fast assembly and disassembly of the awning are important, especially in vehicle applications. Vehicle awnings also must be rugged and durable because they are constantly exposed to the elements. Aside from functioning efficiently, the awning should also be aesthetically attractive in its installed and retracted positions. A minimum amount of hardware should be exposed during travel to provide a durable and attractive unit.

SUMMARY OF THE INVENTION

The present invention provides an improved awning assembly which is more closely related to the box type awnings described above, but could also be applied to a shifting position roll type awning. The basic assembly includes an elongated case adapted to be attached to a generally vertical wall. A roller tube extends longitudinally of, and is rotatably mounted in the case. An awning having a first edge is attached to the roller tube, said awning being rolled on the roller tube and adapted to be unrolled from the roller tube to an extended position. A lead rail is attached to a second edge of the awning. A pair of rafter arms each have a first end pivotably mounted to the wall, and said rafter arms are adapted to hold the lead rail a selected distance from the wall when the awning is extended. A pair of support arms are pivotably attached to the lead rail and adapted to support the lead rail when the awning is extended.

The improvements include the rafter arms being telescoping and biased toward an extended position. Also, a slider is disposed on an end of each rafter arm and disposed in a slide channel of the lead rail so as to slide in the channel when the awning is extended or retracted.

The rafter arms are telescoping and biased toward an extended position. A slider is disposed on an end of each rafter arm and disposed in a slide channel on the wall so as to slide in the channel when the awning is extended or retracted.

A removable third rafter arm is insertable between the lead rail and the wall when the awning is extended.

A stowage channel is disposed along a lower edge of the lead rail, the support arms being pivotable so as to be stowable in the stowage channel.

The support arms are extendable and include an elongated middle arm; an elongated upper arm having part of the inner arm slidingly disposed therewith; an upper arm lock for locking the inner arm and upper arm from relative sliding; a lower arm having part of the inner arm slidingly disposed therewith; and a lower arm lock for locking the inner arm and upper arm from relative sliding at a predetermined position.

A rigid elongated awning shield is disposed between the second edge of the awning and the lead rail, said shield being hingedly attached to the lead rail so as to at least partially cover the awning when the awning is retracted and lay generally horizontally when the awning is extended.

A pair of feet are disposed on the wall below the roller tube, each foot having a horizontal pin; a slot is disposed in a lower end of each support arm and is adapted to receive the pin therein so as to support the support arm on the foot; a latch bar is slidingly disposed in each support arm and biased toward the lower end, said latch bar having a projection obstructing parts of the slot when the latch bar is in a lower position so as to secure the pin in the slot, said latch bar being movable to an upper position so as to permit the pin to be removed from the slot.

A bearing socket is disposed on each end of the lead rail, said bearing socket having a longitudinal bore therethrough and a side opening through a part of a side of said bore and opening generally downwardly through a side of the bearing socket. A generally cylindrical lock bar is disposed in the bore and adapted to slide longitudinally in the bearing socket and rotate about a longitudinal axis. A pivot rod is attached to the lock bar and extends through the side opening and is attached to the support arm to permit pivoting of the support arm about the longitudinal axis. A lock socket is mounted on the wall and adapted for slidingly receiving the lock bar therein so as to prevent lateral movement of the lead rail.

A novel method of assembling a support for an awning rolled on a roller tube is also disclosed. The roller tube is mounted on a generally vertical wall, and the assembly steps include:

a) releasing a lower end of a first support arm from a generally horizontal, stowed position;

b) pivoting the support arm down to a generally vertical position;

c) securing the lower end of the support arm to a foot disposed on the wall below the roller tube;

d) repeating steps a) through c) for a second support arm;

e) unlocking a lead rail having an edge of the awning attached thereto;

f) pulling the lead rail from the wall so as to unroll the awning from the roller tube, and so as to extend a pair of spring biased rafter arms disposed between the wall and the lead rail; and g) pivoting the rafter arms to a position generally perpendicular to the lead rail so as to tension the awning.

Additional steps include extending and locking each support arm to a predetermined length while securing the support arms in the feet; extending each support arm to a selected length after pulling lead rail from the wall; detaching one support arm from its foot and positioning the one support arm on a generally horizontal surface so as to support the awning; detaching the other support arm from its foot and positioning the other support arm on a generally horizontal surface so as to support the awning; and inserting a third rafter arm between the wall and the lead rail.

The lead rail is unlocked by sliding an upper end of each support arm transversely so as to move a lock bar attached thereto out of a lock socket attached to the wall.

The awning is easily mounted to a wall or recreational vehicle to provide a compact, attractive appearance. Erection of the awning is simple enough to be accomplished by one person to provide a sturdy and versatile shelter. Whereas the present description relates to a case type awning having a stationary roller tube, some or all of the elements of the present invention could be easily adapted to a shifting roll type awning with minor modifications.

BRIEF DESCRIPTION OF THE DRAWINGS

FIG. 3 shows a perspective view, partially exploded, of a lead rail and support arm pivot assembly according to the invention;

FIGS. 3A, 3B, and 3C show front, bottom and side detail projections of a right hand bearing socket;

FIGS. 11A and 11B show detail views of a center rafter slide;

FIG. 12A shows a detail of an alternative installation of the rafter arm;

DESCRIPTION OF THE PREFERRED EMBODIMENTS

Figure 1:
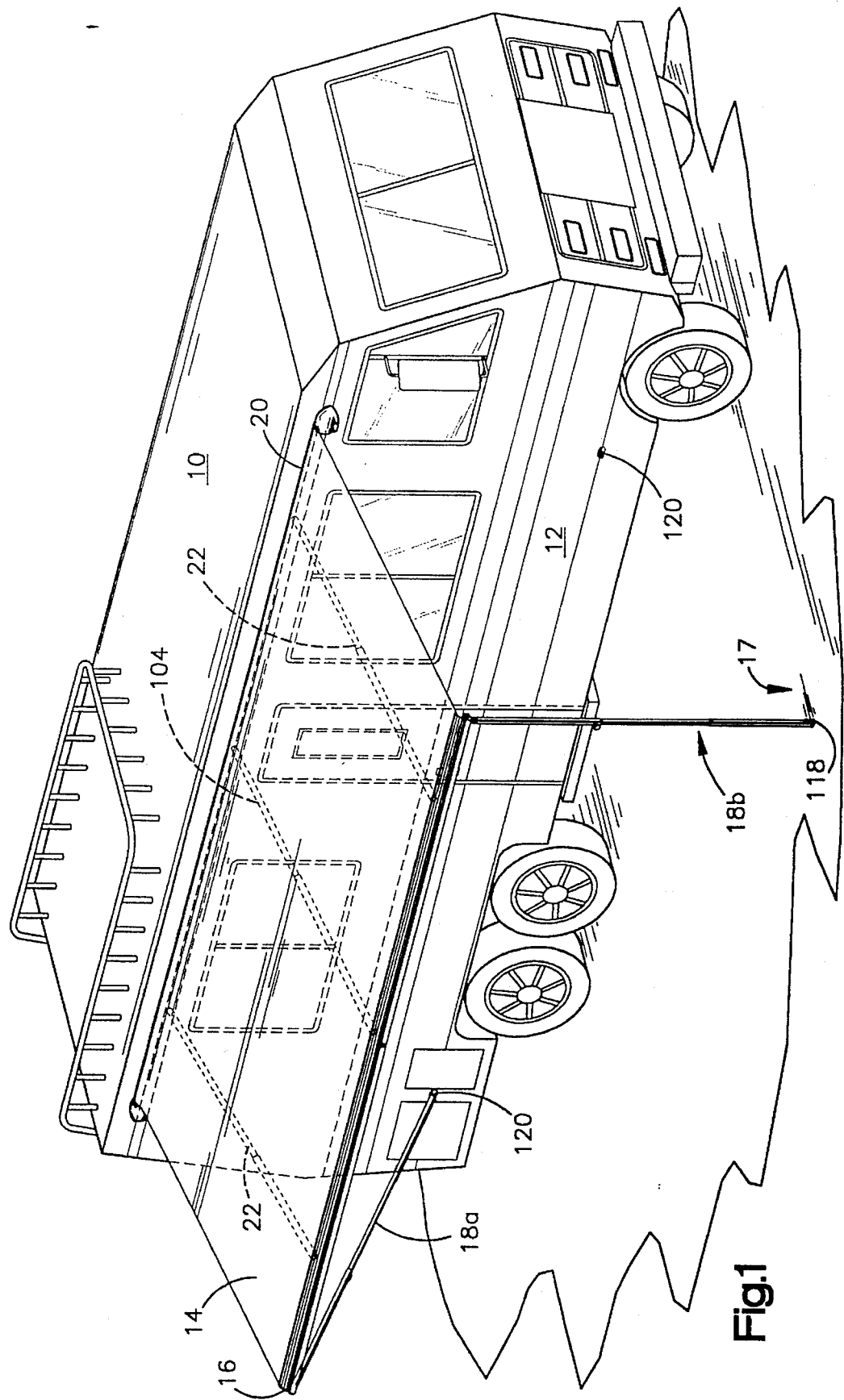
FIG. 1 shows a perspective view of a recreational vehicle having an awning assembly according to the present invention.

Referring to FIG. 1, a recreational vehicle 10 has a generally vertical wall 12. The wall 12 could be that of a building or other stationary or mobile structure. The present description is directed to a vehicle. An awning 14 is mounted to the wall 12 so as to be suspended in a generally horizontal manner to form a shelter adjacent the wall 12. The awning is made from vinyl, canvas, or other materials as is known in the art. An edge of the awning is fastened to a lead rail 16 supported above a surface 17 adjacent the wall 12 on a pair of support arms 18, which will be further described below. A case assembly 20 is mounted on the wall 12 at a desired height for the awning 14. A pair of rafter arms 22 are disposed between the wall 12 and the lead rail 16 to hold the awning in tension. Spacing the rafter arms maximum of about eight feet on either side of the center of the roller tube minimizes horizontal deflection of the lead rail.

Figure 7:
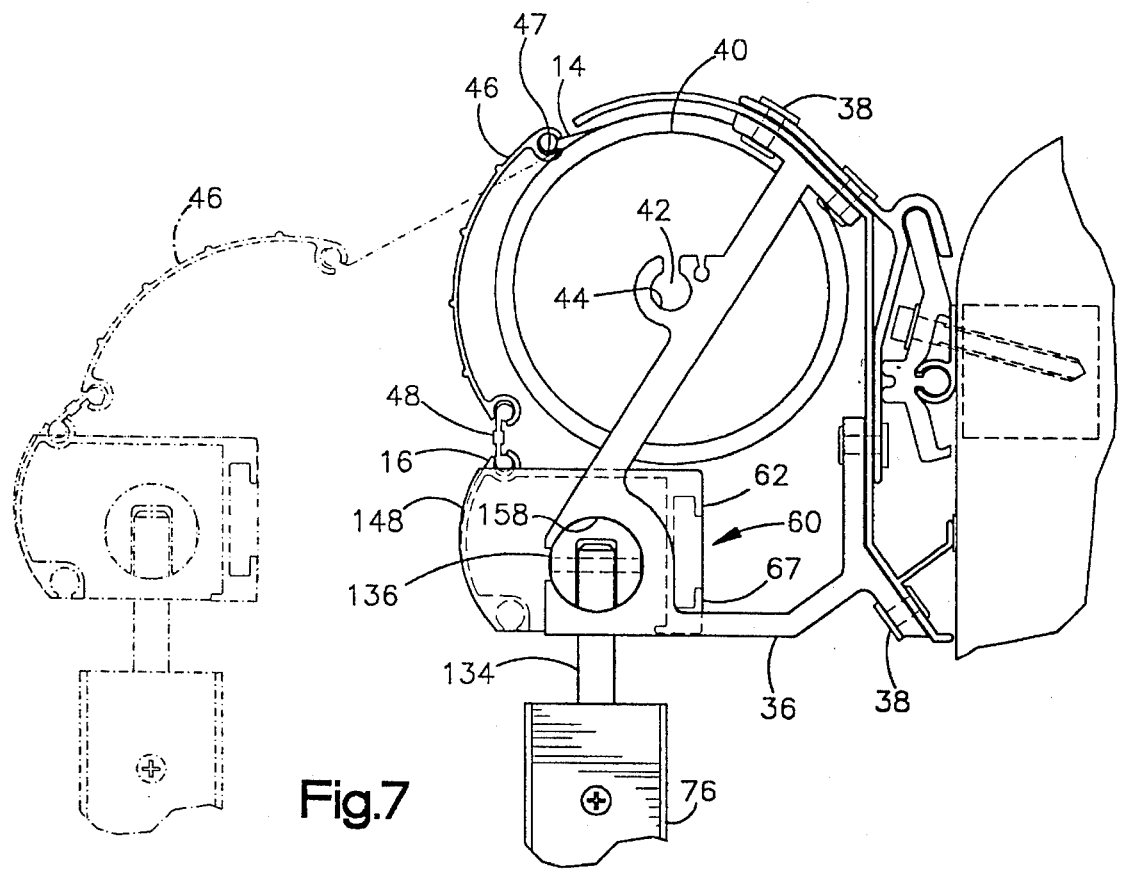
FIG. 7 shows an end view of the awning assembly with the end cap removed.
Figure 12:
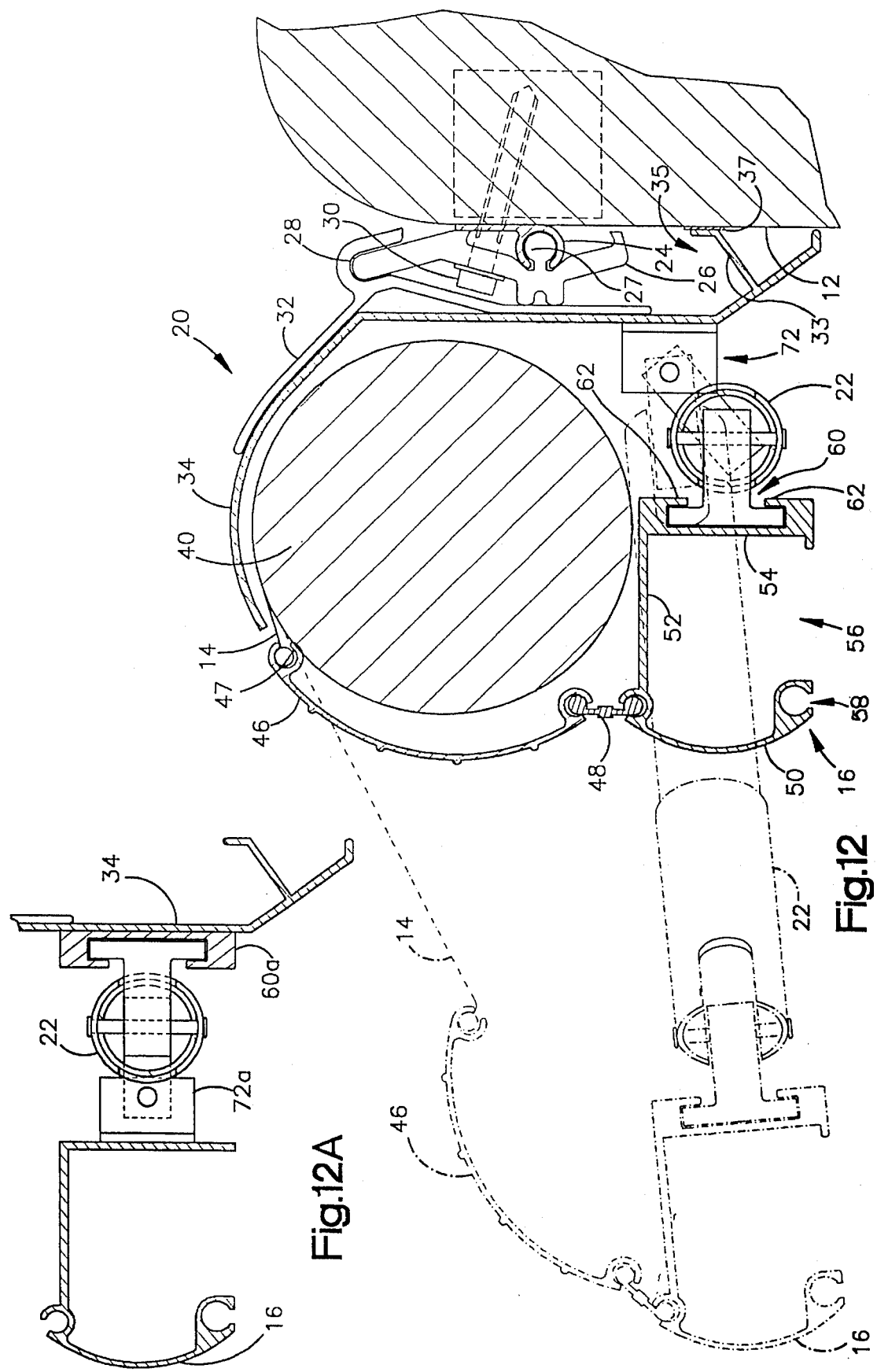
FIG. 12 shows a sectional end view of the awning assembly; 19
Figure 13:
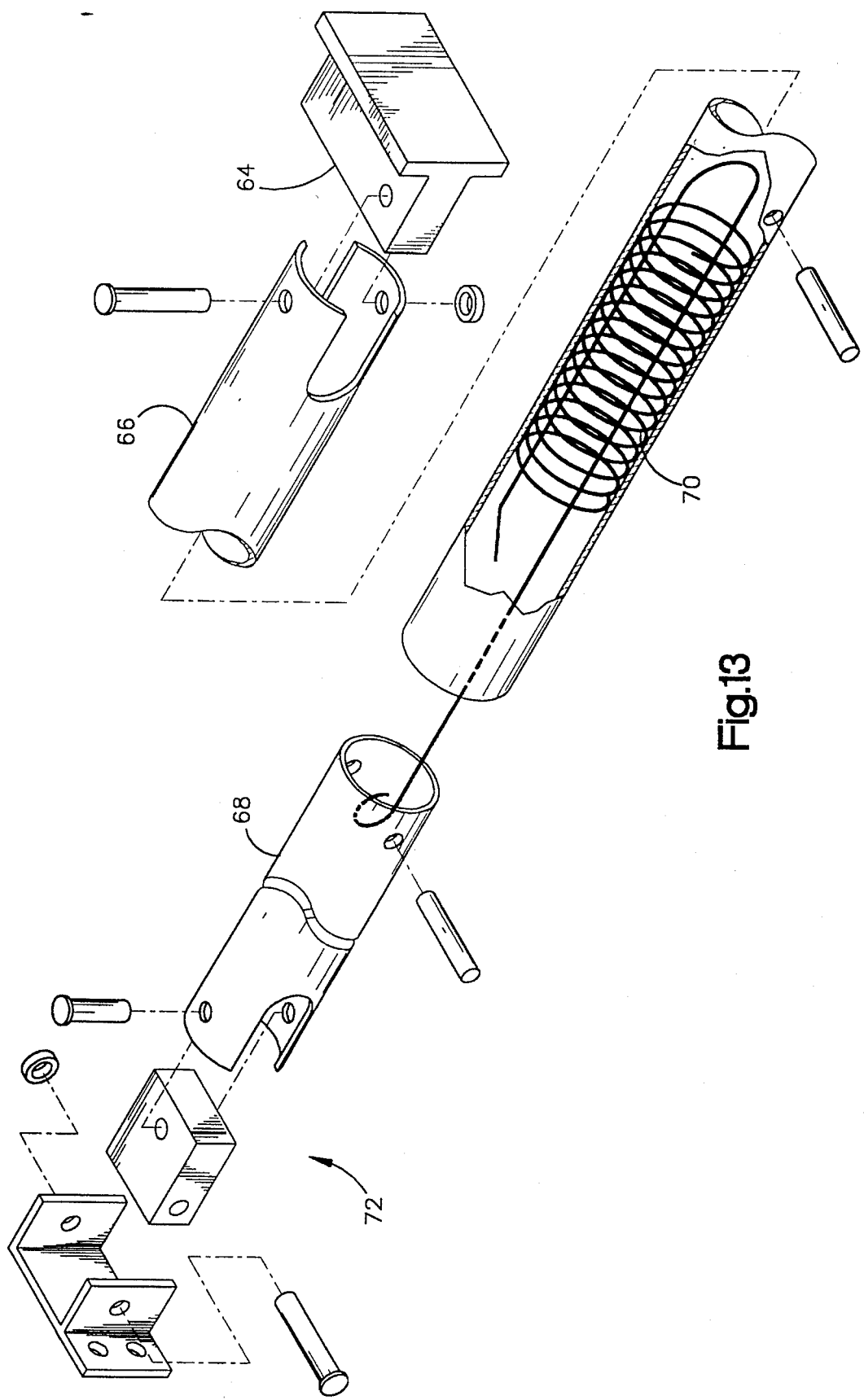
FIG. 13 shows an exploded view of a rafter arm.

Referring to FIG. 12, an awning rail 24 including a "C" channel is securely fastened to the wall 12. The case assembly 20 includes a pair of rail hooks 26, one disposed near each end of the case assembly. The rail hook 26 includes a generally cylindrical rail 27 or ball received in the "C" channel. The rail hook 26 is secured in place by one or more lag screws 30. Alternatively, the rail 27 may be omitted and additional lag screws or other fasteners may be used. An upward projection 28 of each rail hook 26 supports a case bracket 32. An elongated case 34 is fastened near each of its ends to the case bracket 32. The case has a flange 33 fastened or pressed against the wall 12 so as to define a rain gutter 35 for directing rain water toward ends of the awning assembly. A weather strip 37 of foam, for example, is disposed between the flange 33 and the wall 12. As shown in FIG. 7, an end bracket 36 is secured to each end of the case 34. In the embodiment shown, the end brackets 36, the case 34, and the case bracket 36 are preassembled and secured by rivets 38 or other known fasteners. The assembled case, end bracket, and case bracket are hooked on the rail hook and secured by lag screws through the case bracket and rail hook into the wall. Awning rails of the type shown are commonly found on recreational vehicles. The case 34 shown is adapted for mounting thereto, but could be mounted directly to the wall by various means which will be apparent to one skilled in the art.

As shown in FIGS. 7 and 12, the awning 14 is fastened to and rolled on a roller tube 40. The roller tube is counterbalanced in rotation by a spring mechanism of a type known in the art. The awning can be rolled onto and unrolled from the roller tube with a minimum effort. The roller tube 40 is supported on an axle 42 at each end by an axle support 44 of the end bracket 36.

The awning may be attached directly to the lead rail 16 or, as shown, the awning is attached to a shield 46. For example, a rod 47 sewn into the awning is received in a "C" channel of the shield. The shield 46 is preferably a rigid, protective cover of aluminum, for example, and is curved to conform generally to the awning 14 rolled on the roller tube 40. The shield 46 is attached to the lead rail 16 by a hinge 48. The hinge preferably comprises an elongated aluminum bar, for example, having a opposed rails received in "C" channels of the shield and lead rail, respectively. The attachments of the shield to the awning 14 and the lead rail 16 permit the shield to take a generally vertical position to cover and protect the awning when the awning is in a retracted or rolled position, as shown in solid lines in FIGS. 7 and 12. When the awning is in an extended or unrolled position, the shield pivots to a generally horizontal position, as shown in phantom in FIGS. 7 and 12.

The lead rail 16 is preferably an elongated, rigid, aluminum extrusion. A front wall 50, top wall 52, and rear wall 54 define a generally rectangular stowage channel 56. The shape of the channel is such that it will receive the support arms 18 as discussed below. A lower "C" channel 58 is disposed on an edge of the front wall for hanging plants, lights, screen rooms or other items. A generally rectangular slide channel 60 having flanges 62 or lips is disposed on a rear face of the rear wall 54.

Referring to FIGS. 11, 12, 12A and 13, each of the rafter arms 22 has a slide 64 pivotably attached on an end thereof. The slide 64 is preferably "T" shaped so as to be firmly received in the slide channel 60, but slidable freely therein. The rafter arm has an outer rafter 66 telescoping on an inner rafter 68 biased toward an extended position by a spring 70, for example. The rafter arm 22 is mounted to the case 34 or the wall 12 by a pivot bracket 72 preferably allowing pivoting of the rafter arm on two axes. Each of the rafter arms is spaced from the center of the case 34 a distance slightly greater than the length of the rafter arm in a retracted position. When the awning is unrolled to its extended position, the slides 64 slide in the slide channel 60 so that the rafter arms pivot from a position generally parallel with the roller tube 40 to a position nearly orthogonal to the roller tube. The rafter arms are manually pivoted to an orthogonal position relative to the roller tube so as to bias the awning toward its extended position to maintain tension on the awning, as shown in FIG. 1.

Figure 14:
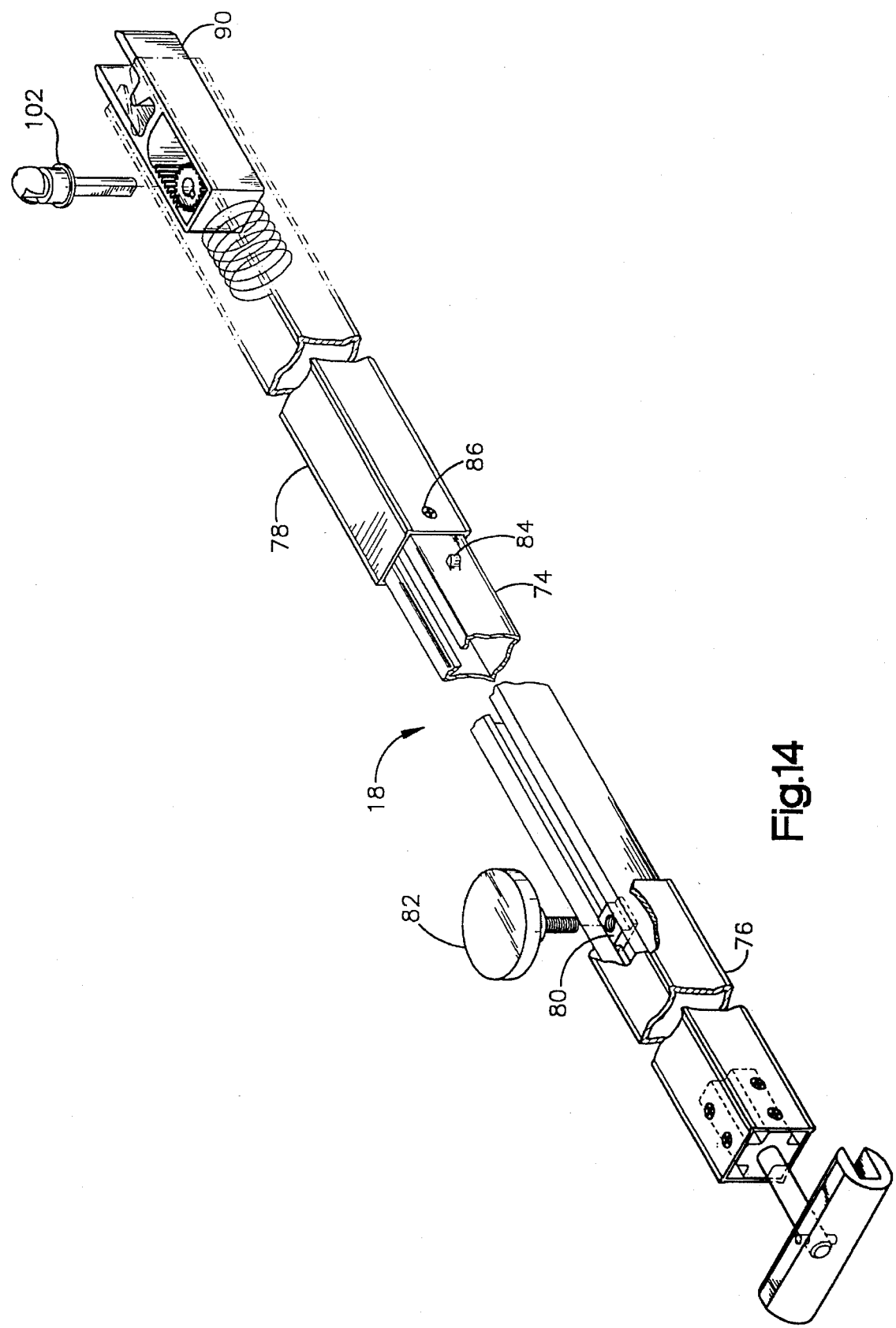
FIG. 14 shows an exploded view of a support arm.

Referring to FIG. 14, each support arm 18 includes an inner arm 74 telescoping inside an upper arm 76 and a lower arm 78. The arms are preferably hollow and generally rectangular in cross-section. The upper arm 76 is pivotably attached to the lead rail 16 as described below. The relative position of the upper arm 76 on the inner arm 74 can be selectively locked by a known device, such as a screw clamp 80 operated by a knob 82. Alternatively, a lever clamp or a plurality of holes adapted to receive a snap button or latch projection can be used. A lower arm lock, such as a snap button 84 received in a hole 86, is provided to lock the lower arm 78 and inner arm 74 in a predetermined relative position. A latch bar assembly 88 is disposed on the lower end of the lower arm 78, as described below.

Referring to FIG. 12A, the rafter arm 22 is shown in an alternative installation. A slide channel 60a is disposed on the case 34 to receive therein a slide 64a on one end of the rafter arm 22. A pivot bracket 72a is mounted on the lead rail 16 to secure the other end of the rafter arm 22 thereto. When the awning 14 is extended the rafter arm pivots and slides to a position generally perpendicular to the lead rail 16.

The rafter arms 22 and support arms 18 are described as telescoping arms. However, other configurations of adjustable length arms, such as side-by-side sliding members, would be suitable.

Referring to FIGS. 2, 8, 9, and 10, the latch bar assembly 88 includes a latch bar 90 received within the lower end of the lower arm 78 and preferably made of anodized aluminum. The latch bar 90 has projections such as fingers 92 extending longitudinally from the lower arm. In a space between the fingers 92, a projection such as a bar 94 extends generally horizontally from one of the fingers 92. An upper end of the latch bar has a rack 96 disposed thereon which meshes with a pinion 98 journalled in the lower arm 78. An axle 100 having a head 102 is disposed through the pinion 98. The head is adapted to be rotated by hand or by other means such as a pole 104 so as to rotate the pinion 98 thereby sliding the latch bar 90 inside the lower arm 78. As shown in the preferred embodiment, the pole has a hollow end 106 for receiving the head 102. A clip having a tongue 108 in the hollow end 106 engages a slot 110 of the head 102 to rotate the axle 100 when the pole 104 is rotated. The latch bar 90 is biased downwardly by a spring 112, for example.

Figure 8:
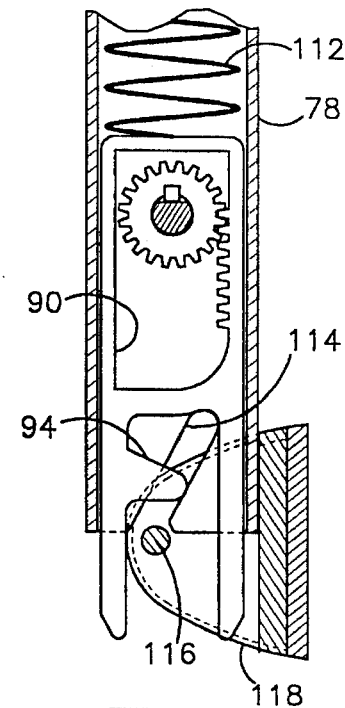
FIGS. 8, 9, and 10 show an elevational view of a lower end of the support arm being secured to a foot.
Figure 9:
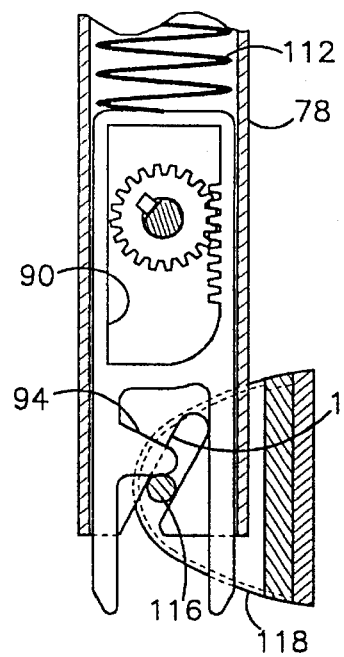
Figure 10:
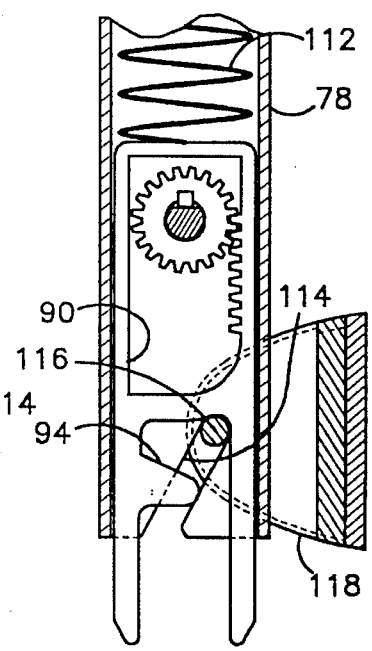

As shown in FIGS. 8–10, a pair of opposed, parallel slots 114 are disposed in the lower end of the lower arm 78. The slots 114 are angled relative to the bar 94 so that a lower part of each slot near its opening will intersect with the bar when the latch bar 90 is in its lower position, as shown in FIGS. 8 and 10. The upper part of each slot is located such that the bar 94 does not intersect therewith, as shown in FIG. 9.

Figure 2:
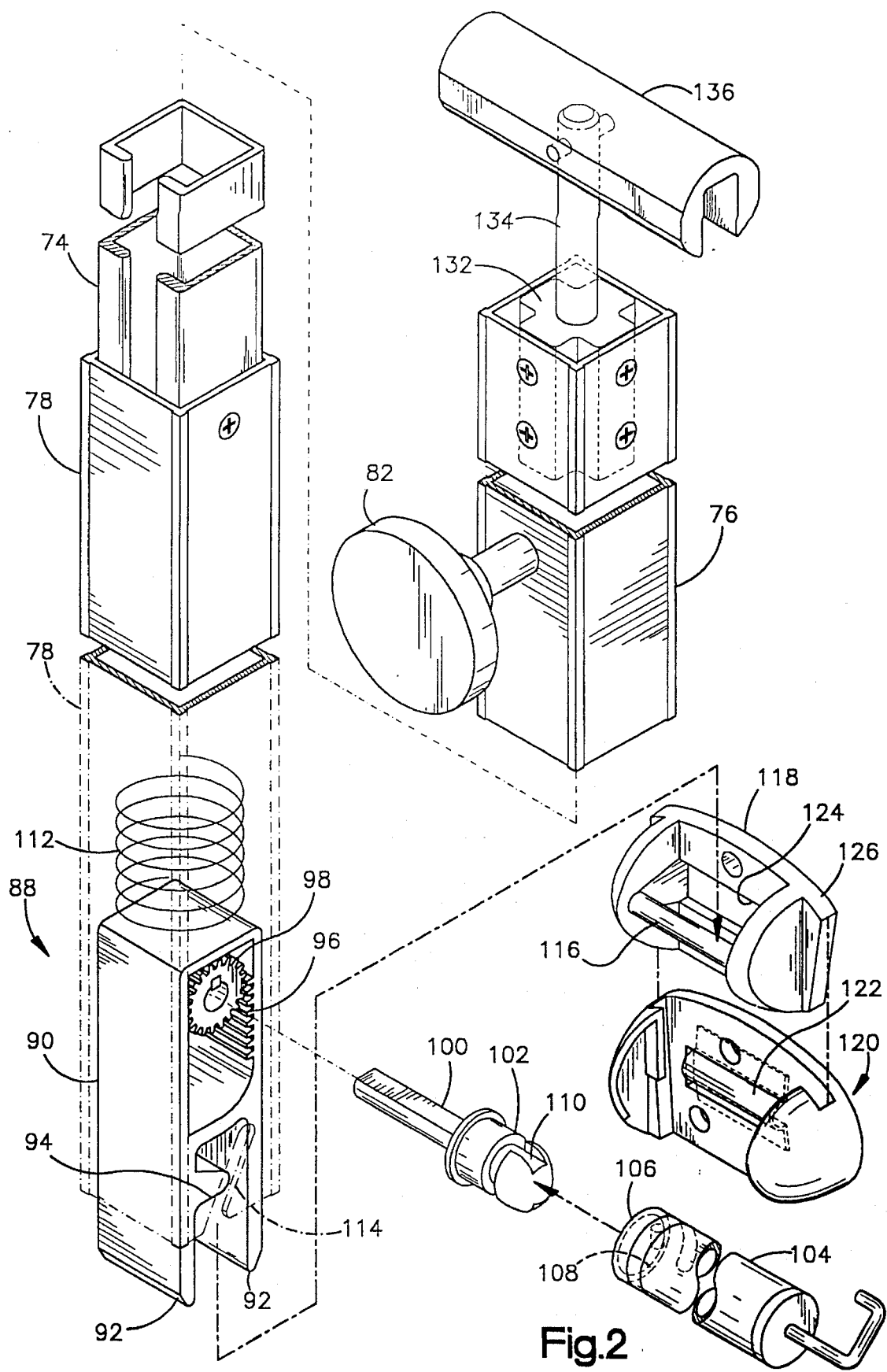
FIG. 2 shows an exploded view of a support arm of the awning.

The slots are adapted to receive a pin 116 of a foot 118, also shown in FIG. 2. The lower arm 78 of the support arm 18 is placed on the foot 118 so that the pin 116 is received in the slots 114, as shown in FIG. 8. The pin 116 forces the bar 94 upwardly, as shown in FIG. 9. After the pin 116 passes the bar 94, the bar is returned to its lower position by the spring 112, as shown in FIG. 10. In the lower position, the bar 94 obstructs the slots 114 to prevent the pin from being withdrawn from the slots. To withdraw the pin 116 from the slots 114, the latch bar 90 is raised by turning the axle head 102 or pressing one of the fingers 92 upwardly. Raising the latch bar 90 moves the bar 94 to its raised position where it does not obstruct the slots 114. The lower arm 78 can then be lifted off the pin 116.

The hollow support arms 18 described use two slots 114. However, a solid arm could have a single slot, for example. The bar would be disposed on a side of the arm.

Returning to FIG. 2, the foot 118 is slidingly received in a base 120 having a retainer 122 such as a leaf spring. The retainer engages a slot 124 of the foot 118 to hold the foot in the base 120. Two bases 120 are mounted to the wall 12 below and near each end of the case assembly 20, as shown in FIG. 1. When the foot 118 is secured in the lower arm 78, the foot and support arm 18 are relatively pivotable. A bottom 126 of the foot 118 can have the generally vertical orientation shown in FIG. 10. The support arm 18 can be pivoted from a generally vertical orientation shown in FIG. 10 to an angled position shown in FIG. 1 (see, support arm 18a). In addition, the foot 118 can be removed from the base 120 and pivoted so that the bottom 126 has a generally horizontal position and is placed on the ground surface 17 to support the support arm 18b, as shown in FIG. 1.

Figure 6:
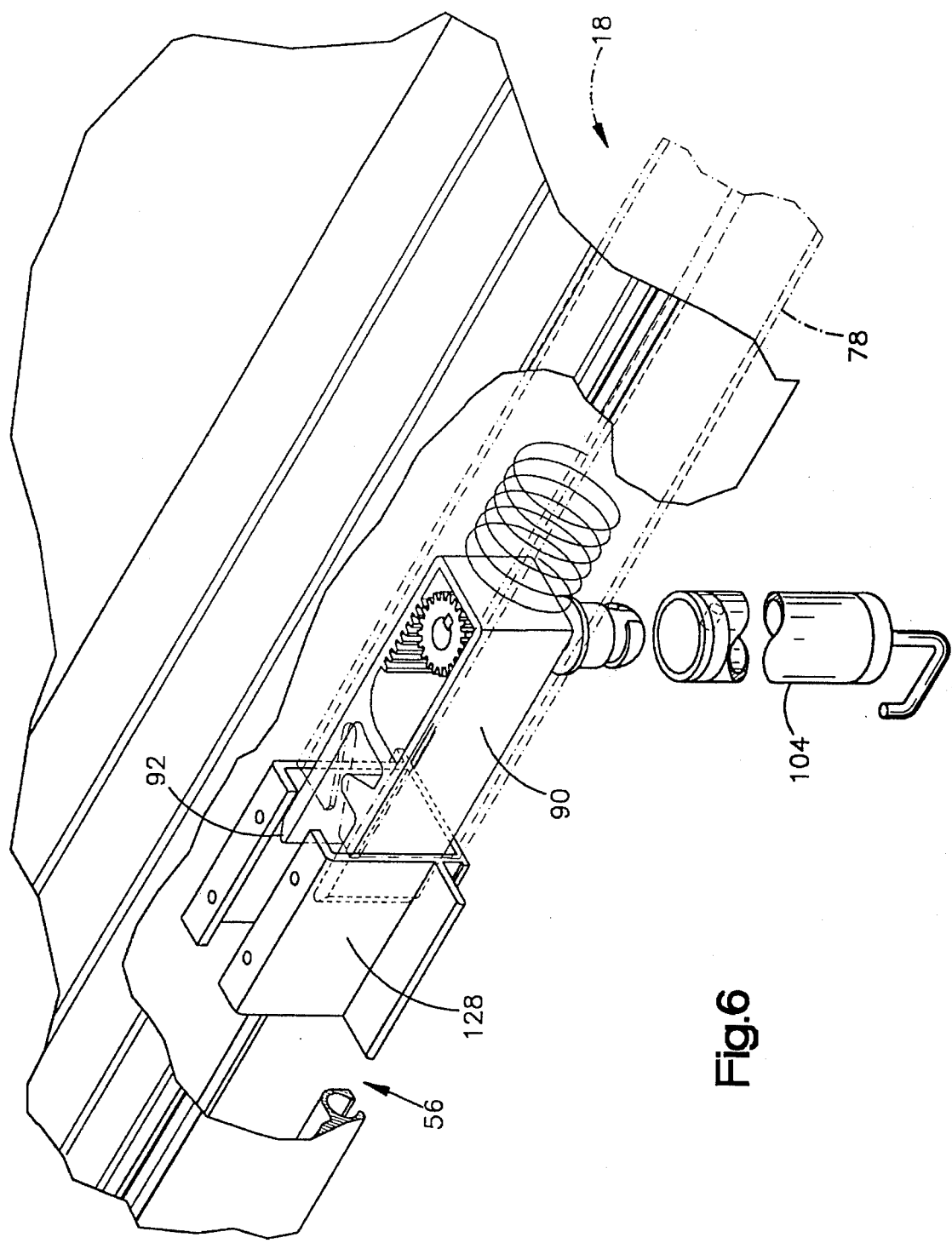
FIG. 6 shows a cut away view of the lead rail showing a stowage latch mechanism of the support arm.

Referring to FIGS. 3 and 6, a pair of pockets 128 are disposed in the stowage channel 56 of the lead rail 16. Each pocket 128 is generally hollow and has a horizontal surface 130. Each pocket is positioned so that when its corresponding support arm 18 is received in the stowage channel 56, as discussed below, the lower arm 78 extends nearly to the pocket 128. When the latch bar 90 is in its lower position, as discussed above, the fingers 92 extend beyond the lower arm 78 and are received in the pocket 128 and rest on the horizontal surface 130 to secure the support arm 18 in the stowage channel 56. When the latch bar 90 is retracted by hand or with the pole 104, as discussed above, the fingers 92 clear the horizontal surface 130 to permit removal of the support arm 18 from the stowage channel 56.

Referring to FIGS. 3, 4, 5, and 7, the upper arm 76 of each support arm 18 has a bushing 132 disposed therein. The bushing 132 is preferably rigidly mounted in the upper arm 76 and holds a pivot rod 134 generally centered in the upper arm. The pivot rod is pivotably attached to a lock bar 136 with a pin 138, for example. The lock bar 136 has a generally cylindrical shape with a channel 140 along at least part of its length. The channel 140 is large enough to receive the pivot rod 134 therein so that the pivot rod and the lock bar 136 are generally parallel. Accordingly, the channel 140 should extend from the pin 138 to an inner end 142 of the lock bar.

Referring to FIGS. 3, 3A, 3B, and 3C, a preferably thermoplastic bearing socket 144 is disposed in each end of the stowage channel 56. As will be apparent, left and right hand mirror-image sockets are used at either end of the lead rail. The socket has a body 146 fitting in and generally conforming to the stowage channel 56. A flange 148 on the body 146 holds the socket 144 at the end of the stowage channel 56. A circular bore 150 extends longitudinally through the socket 144. The bore 150 is slightly larger than the circumference of the lock bar 136 and permits rotation of the lock bar therein. A cavity 152 having a downwardly facing opening provides clearance for the pin 138 and defines end walls 154 against which the pin 138 abuts to limit longitudinal movement of the lock bar 136. An inner end of the bore 150 has a downwardly facing opening 156 wide enough to permit passage of the pivot rod 134 therethrough into the bore 150 so as to be received in the channel 140 of the lock bar 136. The opening 156 should be narrow enough that the bore 150 provides support for the lock bar 136. The configuration of the lock bar and socket permits the support arm to be pivoted on two axes.

Figure 4:
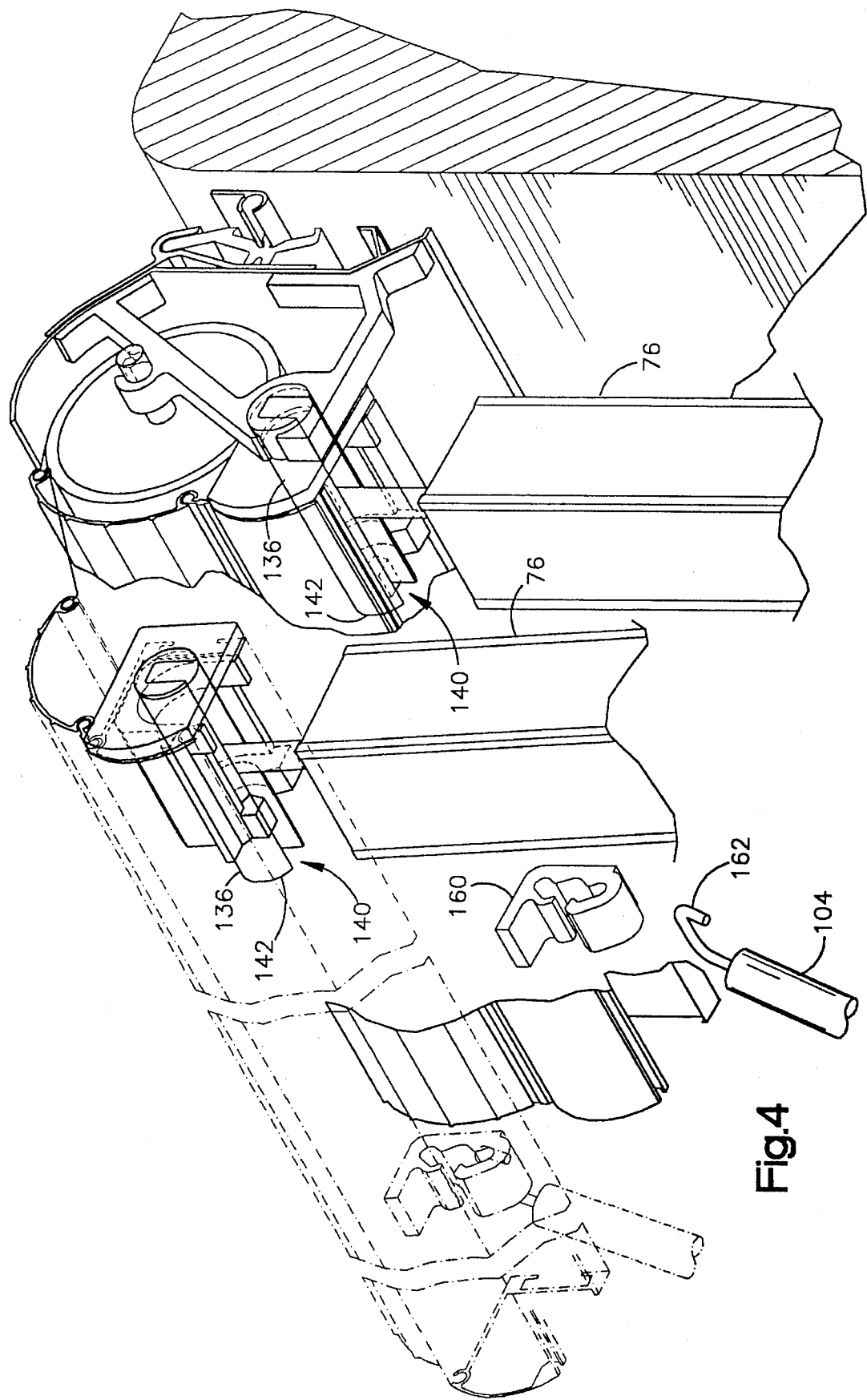
FIG. 4 shows a perspective view looking upwardly at an end of the awning assembly in retracted and partially retracted positions with an end cap removed.

Referring to FIG. 7, the end bracket has a generally cylindrical lock socket 158 which is axially aligned with the lock bar 136 when the awning 14 is in a retracted position. When the lock bar 136 and the lock socket 158 are aligned, the lock bar can be slid axially into the lock socket to prevent lateral movement of the lead rail 16, as shown in FIG. 4. When the lock bar 136 is in the locked position in the lock socket 158 it is still possible to pivot the support arm 18 upwardly into the stowage channel 56. The pivot rod 134 passes through the opening 156 and nests within the channel 140 of the lock bar 136.

A cylindrical lock bar has been described to permit pivoting inside the socket. Other configurations could be utilized, for example, a pivoting ball inside a sliding rectangular socket could provide the pivoting and locking functions.

A "W" hook 160 is mounted in the center of the stowage channel, as shown in FIGS. 3 and 4. The "W" hook is adapted to receive a hook 162 on the end of the pole 104 opposite the hollow end 106. The pole 104 is used to push or pull the lead rail so as to retract or extend the awning 14. A center shelf 163 comprising a narrow bracket having a horizontal surface is attached to the case 34 near its middle. The lead rail rests on the shelf in the retracted position.

Figure 11:
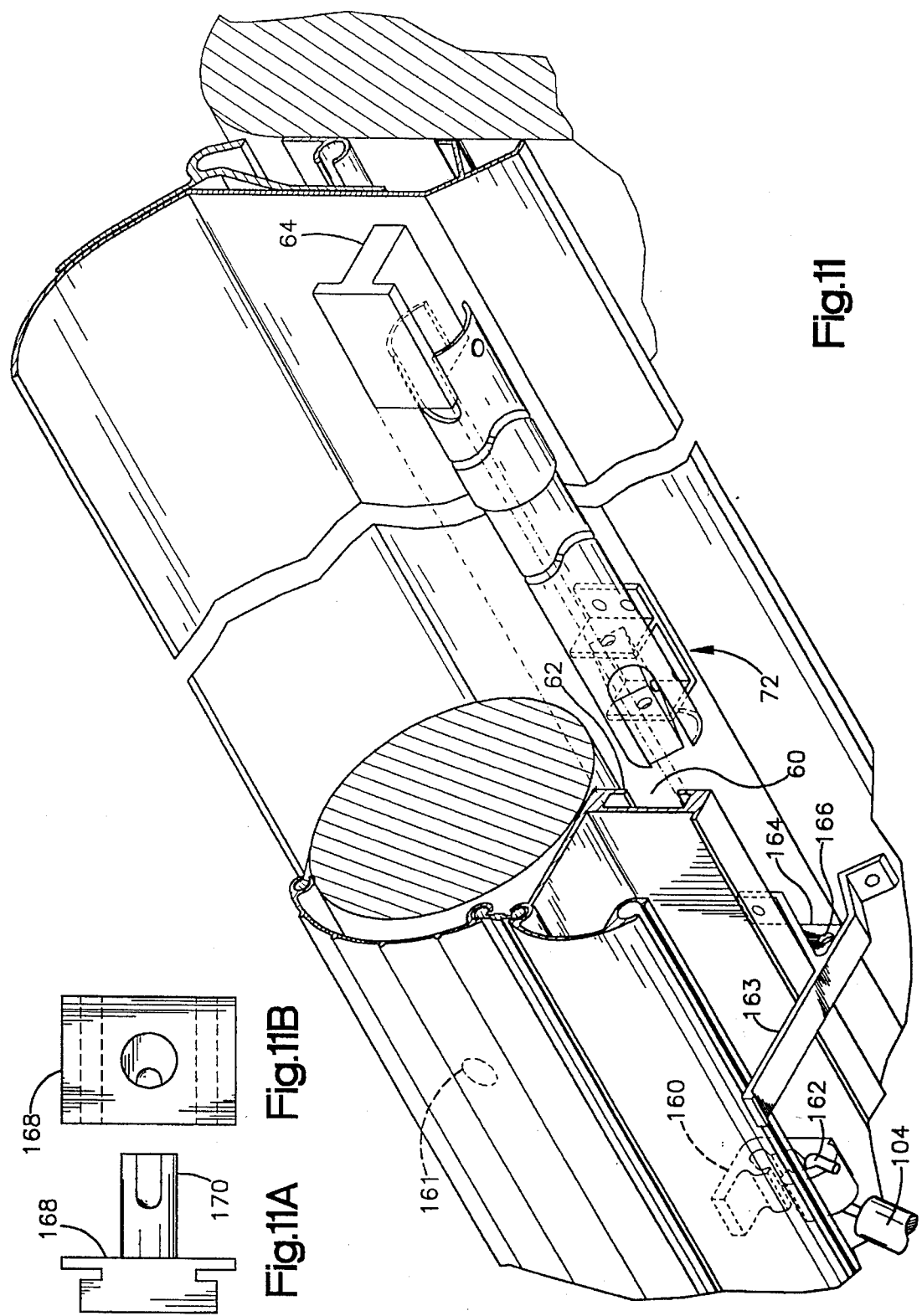
FIG. 11 shows a cut away view of the awning assembly showing a rafter arm in a retracted position.

Referring to FIG. 11, a center rafter support comprises a hole 161 in the roller tube near the center of its length. Alternatively, center rafter support 164 having a hole 166 is mounted to the case near the center of its length. The center rafter support hole 161 or 166 is adapted to receive the hook 162 of the pole 104. As shown in FIG. 11A, a center rafter slide 168 similar to the slides 64 is disposed in the slide channel 60 between the two slides 64. The center slide 168 has a head 170 adapted to be received in the hollow end 106 of the pole 104. The pole 104, can be placed on the slide 168 and in the hole 161 or 166 to serve as a third rafter. Preferably, the pole is extendable and includes a snap button or other locking device to secure the pole 104 at a predetermined length.

Figure 5:
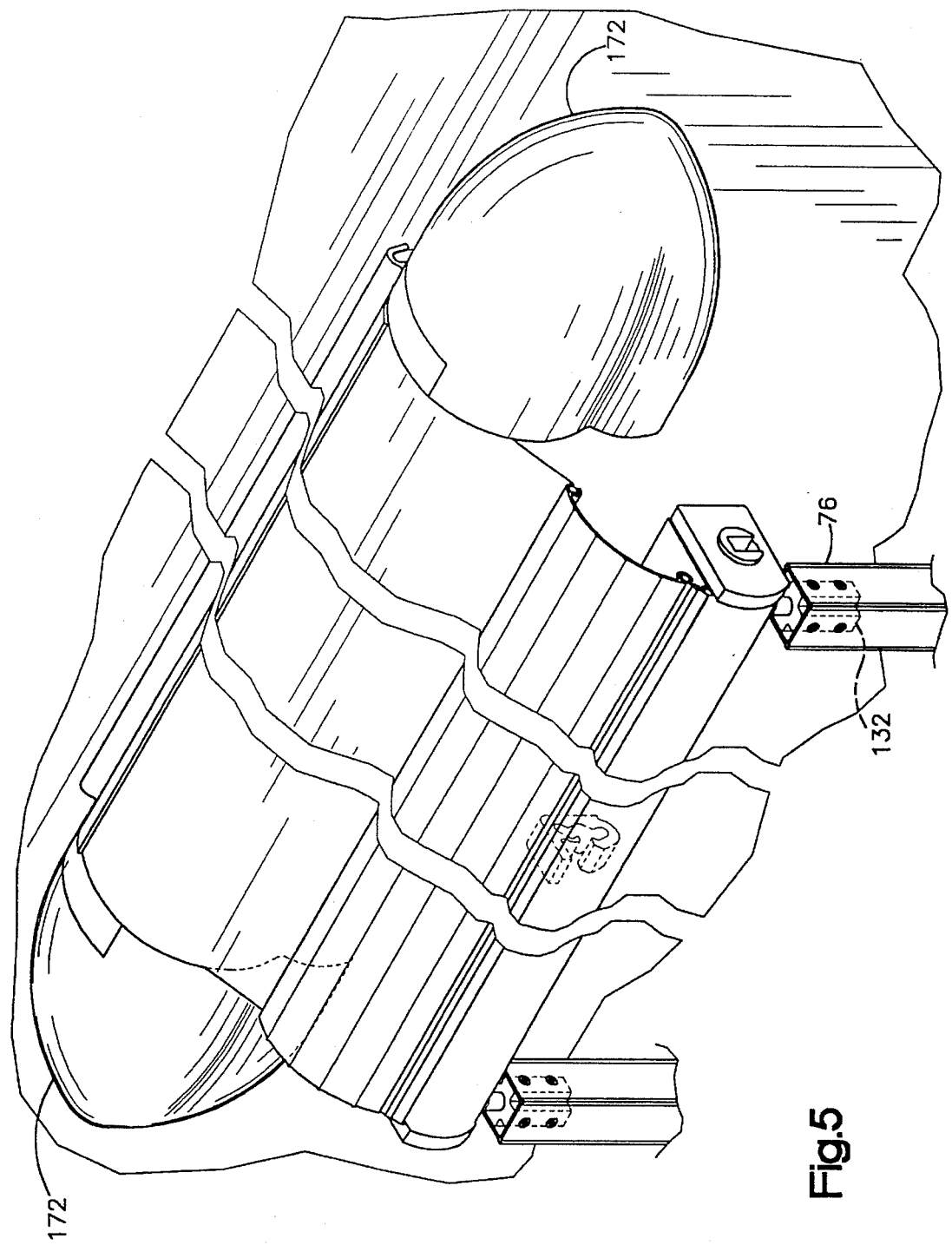
FIG. 5 shows a perspective view looking downwardly at the awning assembly in a nearly retracted position.

As shown in FIG. 5, a decorative plastic end cap 172 is provided on each end of the case assembly 20 to enclose and protect the parts.

Returning to FIG. 1, the entire awning assembly is easily installed on a new or existing wall. The case assembly 20 is mounted to the wall 12 and the feet 118 and corresponding bases 120 are mounted to the wall below the ends of the case assembly 20. The awning assembly is then ready for erection as described below.

Except where otherwise noted, the parts can be made from aluminum or other suitable rigid material. Light weight is preferred for vehicle applications.

In operation, the hollow end 106 of the pole 104 is placed on the axle head 102 of one of the support arms 18a. The pole is rotated to release the fingers 92 from the pocket 128 thereby releasing the support arm 18. The support arm 18 is pivoted downwardly to a generally vertical position. The lower arm 78 is extended until the snap button 84 engages to lock the lower arm at a predetermined length. The predetermined length corresponds to the distance from the lead rail 16 to the corresponding foot 118. As the support arm is being extended, it is placed on the foot 118 so that the pin 116 is received in the slots 114 and locked in place, as discussed above. The other arm 18b is then released and locked on its corresponding foot 118 in a similar manner.

One of the upper arms 76 is used as a lever to slide its corresponding lock bar 136 out of the lock socket 158 thereby releasing an end of the lead rail 16 to permit lateral movement thereof. The other end of the lead rail is released in a similar manner. The hook 162 of the pole 104 is inserted in the "W" hook 160 and the lead rail 16 is pulled to extend the awning. As the awning is extended, the rafter arms 22 also extend and the slides 64 move outwardly in the slide channel. The rafter arms are then manually moved to a position generally perpendicular to the lead rail 16 to provide tension on the awning 14, as shown in FIG. 1.

To place the awning at a desired angle and height, each of the support arms 18 is adjusted to a desired length by turning the knob 82 to loosen the screw clamp. The support arm is extended and the screw clamp is tightened at the desired length. If desired, the awning can be left in this position with the support arms secured to the wall 12, as shown for support arm 18a in FIG. 1. Alternatively, the support arm can be released from the wall and adjusted to rest on the ground. As discussed above, the retainer 122 is depressed to release the foot 118. The support arm is lifted and the foot is slid out of its base 120. The foot pivots downwardly so that its bottom 126 is generally horizontal. The support arm 18 is pivoted away from the wall to a generally vertical position and the foot 118 rests on the ground or other surface 17, as shown for support arm 18b in FIG. 1. The length of the support arm can be adjusted with the knob 82, as described above, if desired.

The pole 104 is extended to its predetermined length and inserted in the center rafter hole 161 or 166 in the roller tube 40 or the center support 164 and on the center slide 168 and slid into a position generally perpendicular to the lead rail 16 to provide additional support.

To store the awning for travel, the steps recited above are reversed. The pole 104 is slid out of its perpendicular position and removed from the center slide 168 and center rafter hole 161 or 166 or center support 164. Each foot 118 is slid into its corresponding base 120. Each support arm is shortened by releasing its screw clamp 80 and then tightening it again in the shortened position. The rafter arms 22 are manually slid out of the perpendicular position. The pole 104 is inserted in the "W" hook 160 and the lead rail 16 is pushed until the awning 14 is fully retracted. As the awning is retracted, the rafter arms 22 slide inwardly to the parallel position. The lock bars 136 are each aligned and slid into the lock sockets 158 using the support arms 18 as levers to secure the lead rail 16 in place.

One support arm is removed from its foot 118 by raising the latch bar 90 and sliding the lower arm 78 off the pin 116. At the same time as the support arm is removed from its foot, the snap button 84 is depressed and the support arm is shortened. The hollow end 106 of the pole 104 is placed over the axle head 102 and rotated to retract the fingers 92. The support arm is pivoted upwardly into the stowage channel and the fingers are released into the pocket 128 to secure the support arm in the stowage channel. The other support arm is similarly stowed. The pole 104 is stowed and the awning is ready for travel.

The present disclosure describes several embodiments of the invention, however, the invention is not limited to these embodiments. Several of the features described represent improvements over the prior art. Awning assemblies known in the prior art can be modified or adapted to use some or all of these features as will be apparent to one skilled in the art. Other variations of the basic design are also contemplated to be within the spirit and scope of the invention and appended claims.

What is claimed is:

1. An improved awning assembly, comprising:

an elongated roller tube extending generally horizontally along a generally vertical wall and rotatably mounted on the wall, the roller tube having a hole adapted for receiving a hook therein;

an awning having a first edge attached to the roller tube, said awning being rolled on the roller tube and adapted to be unrolled from the roller tube to an extended position;

a lead rail attached to a second edge of the awning;

a pair of rafter arms each being disposed between the wall and the lead rail so as to hold the lead rail a selected distance from the wall when the awning is extended; and a pair of support arms pivotably attached to the lead rail and adapted to support the lead rail when the awning is extended;

wherein the improvement comprises:
   a removable third rafter arm insertable between the lead rail and the wall when the awning is extended, wherein the third rafter arm includes a hook on one end, said hook fitting in the hole of the roller tube; and a hollow end fitting on a slide, said slide being slidable in a channel of the lead rail.

2. An improved awning assembly, comprising:

an elongated roller tube extending generally horizontally along a generally vertical will and rotatably mounted on the wall;

an awning having a first edge attached to the roller tube, said awning being rolled on the roller tube and adapted to be unrolled from the roller tube to an extended position;

a lead rail attached to a second edge of the awning;

a pair of rafter arms each being disposed between the wall and the lead rail so as to hold the lead rail a selected distance from the wall when the awning is extended; and a pair of support arms pivotably attached to the lead rail and adapted to support the lead rail when the awning is extended;

wherein the improvement comprises:

a stowage channel along a lower edge of the lead rail, the support arms being pivotable so as to be stowable in the stowage channel.

3. An awning assembly according to claim 2, further comprising a latch on each support arm to secure the support arm in the stowage channel.

4. An awning assembly according to claim 3, wherein the latch comprises a latch bar biased so as to project longitudinally from an end of the support arm and a pocket disposed on the lead rail to receive the latch bar.

5. An awning assembly according to claim 2, further comprising a pivot assembly permitting the support arm to pivot on two axes, and adapted to slide laterally to a locked position engaging a lock socket on the wall so as to prevent lateral movement of the lead rail.

6. An awning assembly according to claim 2, further comprising:

a bearing socket disposed on each end of the lead rail, said bearing socket having a longitudinal bore therethrough;

a side opening through a part of a side of said bore and opening generally downwardly through a side of the bearing socket;

a generally cylindrical lock bar disposed in the bore and adapted to slide longitudinally in the bearing socket and to rotate about a longitudinal axis;

a pivot rod pivotably attached to the lock bar and adapted to pivot on an axis generally normal to the longitudinal axis of the lock bar, said pivot rod extending through the side opening and attached to the support arm; and a lock socket mounted on the wall and adapted to receive the lock bar therein so as to prevent lateral movement of the lead rail.

7. An awning assembly according to claim 6, wherein the bearing socket is disposed in the stowage channel.

8. An improved awning assembly, comprising:

an elongated roller tube extending generally horizontally along a generally vertical wall and rotatably mounted on the wall;

an awning having a first edge attached to the roller tube, said awning being rolled on the roller tube and adapted to be unrolled from the roller tube to an extended position;

a lead rail attached to a second edge of the awning;

a pair of rafter arms each being disposed between the wall and the lead rail so as to hold the lead rail a selected distance from the wall when the awning is extended; and a pair of support arms pivotably attached to the lead rail and adapted to support the lead rail when the awning is extended;

wherein the improvement comprises:
   a pair of feet disposed on the wall below the roller tube, each foot having a horizontal pin; a slot disposed in a lower end of each support arm and adapted to receive the pin therein so as to support the support arm on the foot; a latch bar slidingly disposed in each support arm and biased toward the lower end, said latch bar having a projection obstructing parts of the slot when the latch bar is in a lower position so as to secure the pin in the slot, said latch bar being movable to an upper position so as to permit the pin to be removed from the slot.

9. An awning assembly according to claim 8, wherein the slot is disposed at an angle relative to the movement of the latch bar.

10. An awning assembly according to claim 8, further comprising a spring urging the latch bar toward the lower position.

11. An awning assembly according to claim 8, further comprising a handle operatively connected to the latch bar and adapted to move the latch bar to the upper position.

12. An awning assembly according to claim 11, wherein the handle is connected to the latch bar by a rack and pinion assembly.

13. An awning assembly according to claim 11, further comprising a stowage channel along a lower edge of the lead rail, the support arms being pivotable so as to be stowable in the stowage channel, said stowage channel having a pair of pockets, and each of said latch bars having a second projection adapted to be received in one of the pockets when the latch bar is in its lower position so as to secure the support arm in the channel.

14. An awning assembly according to claim 13, wherein the handle includes a knob adapted to receive an end of a pole used to operate the latch bar.

15. An awning assembly according to claim 8, further comprising a base disposed between each foot and the wall, the foot being removably mounted in the base and said foot being adapted to support the support arm on a surface below the lead rail when removed from the base.

16. An awning assembly according to claim 15 wherein the foot is slidingly received in the base.

17. An awning assembly according to claim 16 further comprising a retainer on the base biased so as to retain the foot in the base.

18. An improved awning assembly, comprising:
   an elongated roller tube extending generally horizontally along a generally vertical wall and rotatably mounted on the wall;
   an awning having a first edge attached to the roller tube, said awning being rolled on the roller tube and adapted to be unrolled from the roller tube to an extended position;
   a lead rail attached to a second edge of the awning;
   a pair of rafter arms each being disposed between the wall and the lead rail so as to hold the lead rail a selected distance from the wall when the awning is extended; and
   a pair of support arms pivotably attached to the lead rail and adapted to support the lead rail when the awning is extended;
   wherein the improvement comprises:
      a bearing socket disposed on each end of the lead rail, said bearing socket having a longitudinal bore therethrough;
      a side opening through a part of a side of said bore and opening generally downwardly through a side of the bearing socket;
      a generally cylindrical lock bar disposed in the bore and adapted to slide longitudinally in the bearing socket and rotate about a longitudinal axis;
      a pivot rod attached to the lock bar and extending through the side opening and attached to the support arm to permit pivoting of the support arm about the longitudinal axis; and
      a lock socket mounted on the wall and adapted to receive the lock bar therein so as to prevent lateral movement of the lead rail.

19. A method of assembling a support for an awning rolled on a roller tube, said roller tube being mounted on a generally vertical wall, comprising the steps of:
   a) releasing a lower end of a first support arm from a generally horizontal, stowed position;
   b) pivoting the support arm down to a generally vertical position;
   c) securing the lower end of the support arm to a foot disposed on the wall below the roller tube;
   d) repeating steps a) through c) for a second support arm;
   e) unlocking a lead rail having an edge of the awning attached thereto by sliding an upper end of each support arm transversely so as to move a lock bar attached thereto out of a lock socket attached to the wall;
   f) pulling the lead rail from the wall so as to unroll the awning from the roller tube, and so as to extend a pair of spring biased rafter arms disposed between the wall and the lead rail; and
   g) pivoting the rafter arms so as to slide an end of each rafter arm along the lead rail to a position generally perpendicular to the lead rail so as to tension the awning.

20. A method according to claim 19, further comprising the step of extending and locking each support arm to a predetermined length while securing the support arms in the feet.

21. A method according to claim 20, further comprising the step of extending each support arm to a selected length after pulling lead rail from the wall.

22. A method according to claim 19 further comprising the steps of detaching one support arm from its foot and positioning the one support arm on a generally horizontal surface so as to support the awning; and detaching the other support arm from its foot and positioning the other support arm on a generally horizontal surface so as to support the awning.

23. A method according to claim 19, further comprising the step of inserting a third rafter arm between the wall and the lead rail.

24. A method according to claim 23, wherein the third rafter arm is used to release the support arms and pull the lead rail prior to insertion between the wall and the lead rail.

\* \* \* \* \*

UNITED STATES PATENT AND TRADEMARK OFFICE
CERTIFICATE OF CORRECTION

PATENT NO. : 5,622,214
DATED : April 22, 1997
INVENTOR(S) : Baka et al.

It is certified that error appears in the above-indentified patent and that said Letters Patent is hereby corrected as shown below:

```
Column 9, line 52 (Claim 2, line 3), delete "will" and
    insert --wall--.
```

Signed and Sealed this

Twelfth Day of August, 1997

Attest:

BRUCE LEHMAN

*Attesting Officer*      *Commissioner of Patents and Trademarks*